(12) United States Patent
Baker et al.

(10) Patent No.: US 8,550,549 B2
(45) Date of Patent: Oct. 8, 2013

(54) SEAT FLAP FOR A VEHICLE SEAT

(75) Inventors: Jason Miles Baker, Pell City, AL (US); Todd Alan Morris, Columbus, OH (US)

(73) Assignee: Honda Motor Co., Ltd., Tokyo (JP)

( * ) Notice: Subject to any disclaimer, the term of this patent is extended or adjusted under 35 U.S.C. 154(b) by 366 days.

(21) Appl. No.: 12/871,653

(22) Filed: Aug. 30, 2010

(65) Prior Publication Data

US 2012/0049596 A1 Mar. 1, 2012

(51) Int. Cl.
*A47C 7/62* (2006.01)

(52) U.S. Cl.
USPC .................. 297/188.1; 297/15; 296/66

(58) Field of Classification Search
USPC ........ 297/15, 188.1, 188.09, 188.08; 296/66, 296/69, 65.05
See application file for complete search history.

(56) References Cited

U.S. PATENT DOCUMENTS

| | | | | |
|---|---|---|---|---|
| 3,246,924 A * | 4/1966 | Krueger et al. | | 296/66 |
| 4,443,034 A * | 4/1984 | Beggs | | 296/65.17 |
| 4,979,772 A | 12/1990 | Carey et al. | | |
| 5,573,288 A * | 11/1996 | Raffensperger | | 297/188.12 |
| 5,887,942 A * | 3/1999 | Allegro, Jr. | | 297/188.12 |
| 5,927,800 A * | 7/1999 | Stallworth | | 297/188.08 |
| 5,971,467 A | 10/1999 | Kayumi et al. | | |
| 6,053,570 A * | 4/2000 | Stern et al. | | 297/188.08 |
| 6,082,816 A * | 7/2000 | Gottlieb et al. | | 297/188.1 |
| 6,161,896 A * | 12/2000 | Johnson et al. | | 297/188.1 |
| 6,199,803 B1 * | 3/2001 | Schafer | | 248/99 |
| 6,416,107 B1 * | 7/2002 | Kanaguchi et al. | | 296/65.09 |
| 6,623,061 B2 | 9/2003 | Tourangeau et al. | | |
| 6,648,395 B2 | 11/2003 | Hoshino | | |
| 6,793,265 B2 * | 9/2004 | Kamida et al. | | 296/64 |
| 6,817,660 B2 | 11/2004 | Ito et al. | | |
| 6,918,625 B2 | 7/2005 | Storto et al. | | |
| 6,971,716 B2 | 12/2005 | DePaulis et al. | | |
| 6,981,730 B2 * | 1/2006 | Bixby | | 296/37.15 |
| 7,152,900 B2 * | 12/2006 | Trombley et al. | | 296/65.09 |
| 7,422,047 B1 * | 9/2008 | McDonald | | 160/229.1 |
| 7,628,438 B2 * | 12/2009 | Partch | | 296/24.46 |
| 7,798,569 B2 * | 9/2010 | Comarella | | 297/188.2 |
| 7,819,468 B2 * | 10/2010 | Tsuda et al. | | 297/188.1 |
| 2001/0002759 A1 * | 6/2001 | Nishide | | 296/65.09 |
| 2003/0184130 A1 * | 10/2003 | Kutomi et al. | | 297/15 |
| 2005/0134076 A1 * | 6/2005 | Storto et al. | | 296/66 |
| 2005/0237173 A1 | 10/2005 | Huang | | |
| 2006/0006705 A1 * | 1/2006 | Charbonneau | | 297/188.08 |
| 2009/0072595 A1 * | 3/2009 | Tsuda et al. | | 297/188.1 |
| 2012/0299338 A1 * | 11/2012 | Hanson et al. | | 297/183.1 |

FOREIGN PATENT DOCUMENTS

| | | |
|---|---|---|
| JP | 2004345487 | 12/2004 |
| JP | 2008207636 | 9/2008 |

OTHER PUBLICATIONS

U.S. Appl. No. 12/871,657, filed Aug. 30, 2010 and entitled "Seat Flap for a Vehicle Seat".

* cited by examiner

*Primary Examiner* — David E Allred
(74) *Attorney, Agent, or Firm* — Rankin Hill & Clark LLP

(57) ABSTRACT

A fold and tumble seat assembly includes a seat cushion having an underside that forms a floor surface when the seat cushion is rotated to a stowed position, and a seat flap attached to the underside of the seat cushion for bridging a gap formed between the seat cushion and an adjacent vehicle floor surface when the seat cushion is in the stowed position. The flap includes a protruding tip adjacent a distal end thereof for facilitating sliding movement of the distal end along the adjacent vehicle floor surface when the seat cushion is rotated.

21 Claims, 7 Drawing Sheets

SEAT FLAP FOR A VEHICLE SEAT

BACKGROUND

The subject disclosure relates to vehicle seats, and more particularly relates to a low wear tip construction for a sliding flap on a vehicle seat.

One known vehicle seat is a fold and tumble vehicle seat that is movable from an occupant position to a stowed position. In particular, a seat back of the vehicle seat can be folded onto the seat cushion and the seat cushion can be flipped or rotated (i.e., tumbled) about a horizontal axis to the stowed position where an underside of the seat cushion forms an upwardly facing surface. Optionally, the vehicle seat can be tumbled into a recess defined in the vehicle floor and the underside surface can be flush with an adjacent surface (e.g., cargo floor).

One issue with these types of seats is that a gap can be formed between the inverted seat cushion and the adjacent floor surface. The gap can be unsightly and function undesirably as a crevice into which loose items can fall and not be easily retrieved without returning the vehicle seat to the occupant position. To deal with the gap, a seat flap is sometimes attached to an underside of the seat cushion. The seat flap covers the gap by bridging from the underside of the seat cushion to the adjacent vehicle floor surface. Thus, the flap spans over the gap hiding the gap and preventing objects from falling into the gap.

A problem with such seat flaps is that they are susceptibility to wear. In particular, the seat flap is typically formed of a high friction material (e.g., fabric or upholstery) and the floor surface over which the vehicle flap slides when the seat is moved between the occupant position and the stowed position is also typically formed of a high friction material (e.g., carpeting). When the seat is moved between the occupant and stowage positions, the fabric flap contacts can rub against the carpeted vehicle floor. This can cause wear, which ultimately results in diminished performance and appearance of the seat flap.

SUMMARY

According to one aspect, a fold and tumble vehicle seat assembly includes a seat cushion having an underside that forms a floor surface when the seat cushion is rotated to a stowed position, and a seat flap attached to the underside of the seat cushion for bridging a gap formed between the seat cushion and an adjacent vehicle floor surface when the seat cushion is in the stowed position. The flap includes a protruding tip adjacent a distal end thereof for facilitating sliding movement of the distal end along the adjacent vehicle floor surface when the seat cushion is rotated.

According to another aspect, a seat flap for a vehicle seat includes a proximal end portion attached to an underside of a rotatable seat cushion and a distal end portion depending from the underside of the rotatable seat cushion. A fold is disposed between the proximal end portion and the distal end portion. At least one protruding tip is disposed adjacent a distal end of the distal end portion for engaging and traversing a vehicle floor surface when the rotatable seat cushion is rotated.

According to still another aspect, a fold and tumble vehicle seat assembly includes a seat cushion rotatable to a stowed position wherein an underside of the seat cushion is flipped over. The vehicle seat assembly further includes a seat flap connected to the underside of the seat cushion so as to depend therefrom when the seat cushion is in an occupant position and to extend from the underside to a vehicle floor surface when the seat cushion is in a stowed position to bridge a gap defined between the seat cushion and the vehicle floor surface. The seat flap includes a protruding tip having a low coefficient of friction for slidable movement along the vehicle floor surface when the seat cushion is moved between the stowed position and the occupant position.

DETAILED DESCRIPTION

Figure 1:
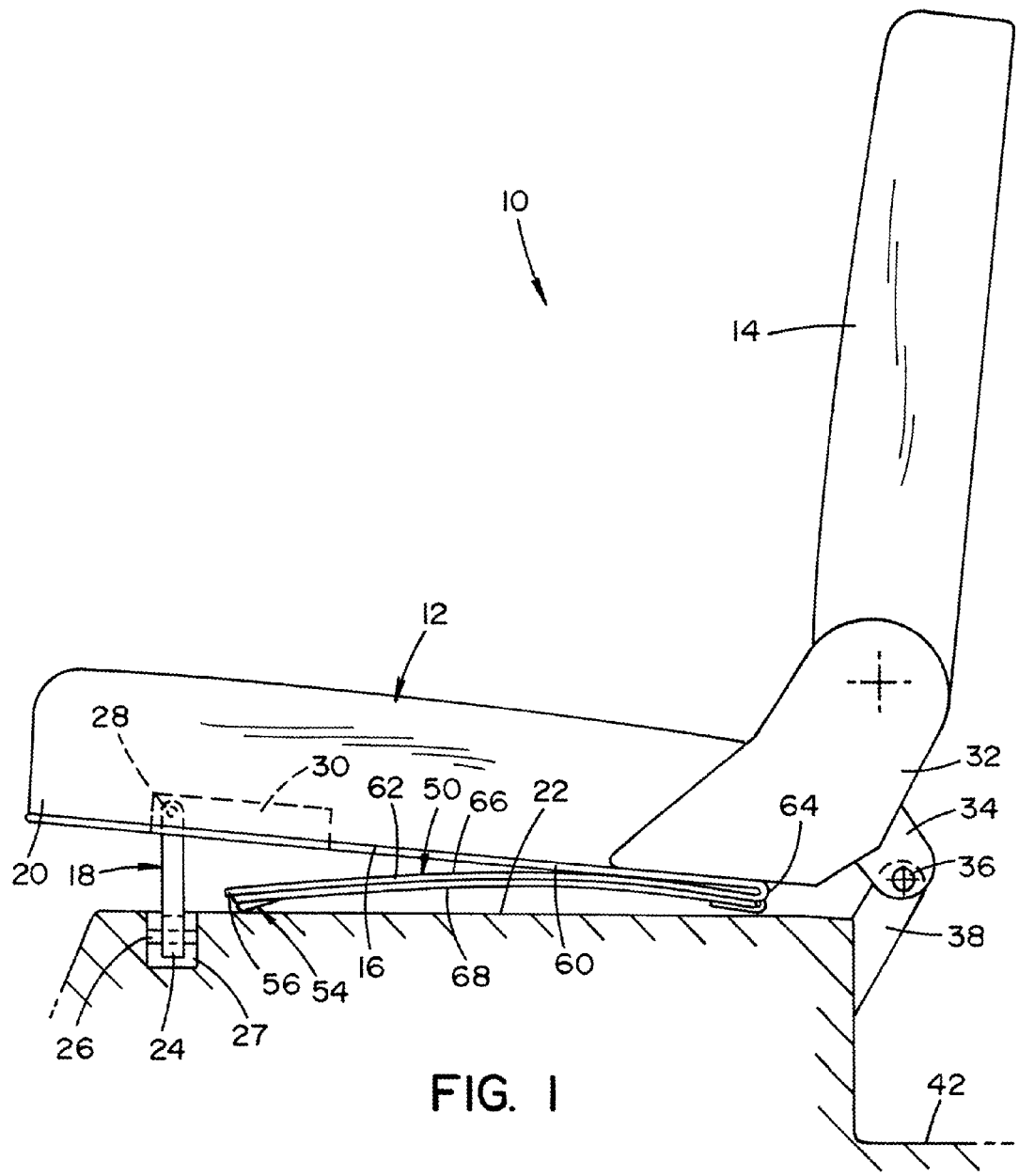
FIG. 1 is a schematic side elevational view of a fold and tumble vehicle seat in an occupant position.

Referring now to the drawings, wherein the showings are for purposes of illustrating one or more exemplary embodiments and not for purposes of limiting same, FIG. 1 illustrates a fold and tumble vehicle seat or seat assembly generally designated by reference numeral 10. The vehicle seat 10 includes a seat cushion 12 and a seat back 14 pivotally connected thereto. Though not shown in the figures, it is to be appreciated that the seat back 14 could include a headrest. In FIG. 1, the vehicle seat 10 is shown in an occupant position wherein the seat back 14 extends upwardly from the seat cushion 12 to allow an occupant to sit in the vehicle seat 10. As will be described in more detail below, the seat cushion 12 is rotatable to a stowed position wherein an underside 16 of the seat cushion 12 is flipped over.

In the illustrated embodiment, the seat cushion 12 has a leg member 18 disposed adjacent a forward portion 20 of the seat cushion 12 for securing the seat cushion 12 in a slightly elevated position relative to a vehicle floor surface 22 disposed below the seat cushion 12 when in its occupant position. The leg member 18 is removably connected to the vehicle floor surface 22, which can be a carpeted floor surface. More particularly, in the illustrated embodiment, a distal end 24 of the leg member 18 can be latched onto a striker or other attaching device 26 connected or provided on the vehicle floor surface 22 (e.g., disposed in recess 27 defined in the floor surface 22). The leg member 18 can have a proximal end 28 opposite the distal end 24 that is pivotally connected to the seat cushion 12. In the illustrated embodiment, the proximal end 28 can be pivotally connected to the seat cushion 12 within a recess 30 defined in the underside 16 of the seat cushion 12, the recess 30 accommodating the leg member 18 when folded therein. With brief reference to FIG. 4, the leg member 18 is shown accommodated or received within the recess 30. As shown, the leg member 18 of the illustrated embodiment has a latch 31 disposed adjacent the distal end 24 for selectively latching onto the striker 26.

With reference back to FIG. 1, the seat cushion 12 can also be pivotally or rotatably connected to the floor surface 22 adjacent a rear portion 32. More particularly, in the illustrated embodiment, a lever 34 secured to the seat cushion 12 is rotatably connected via pivot pin 36 to a lever 38 attached to the vehicle floor surface 22. This arrangement allows the seat cushion 12 to be rotatable and flipped over (i.e., tumbled) to the stowed position. Of course, it should be appreciated by those skilled in the art that the seat 10 is merely illustrative and that other seat types are to be considered within the scope of the present disclosure.

Figure 2:
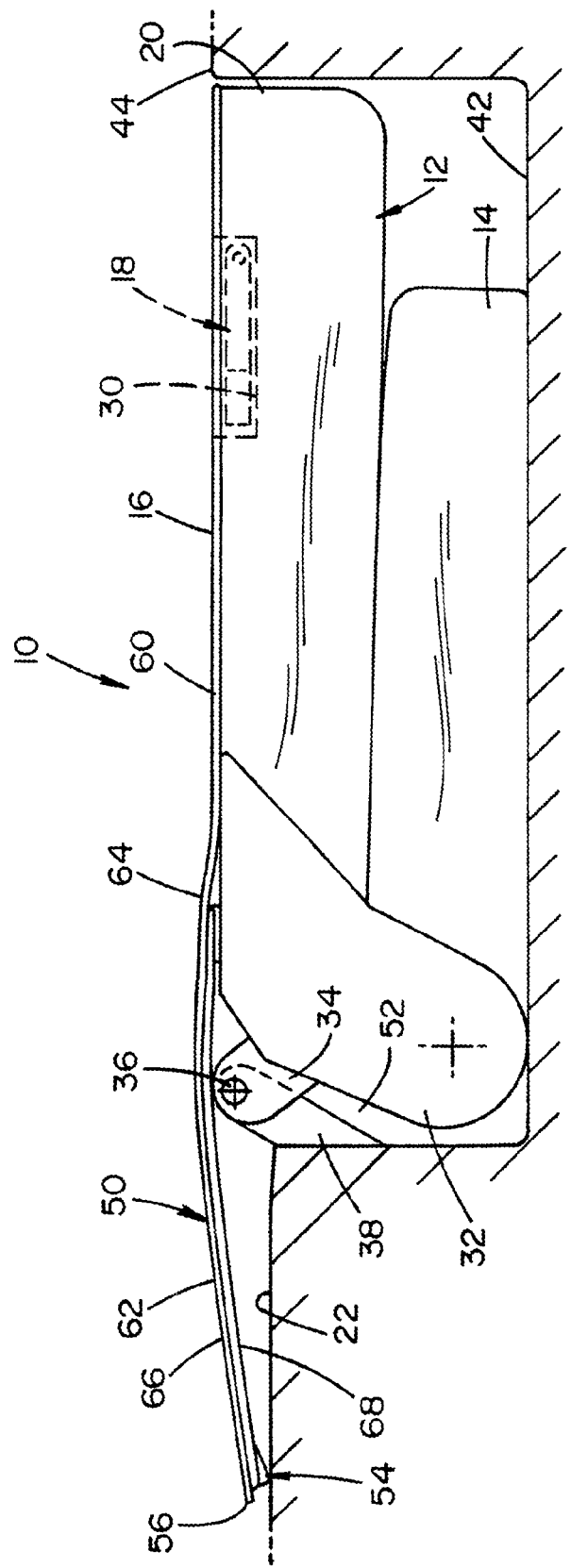
FIG. 2 is a schematic side elevational view of the fold and tumble vehicle seat in a stowed position.
Figure 3:
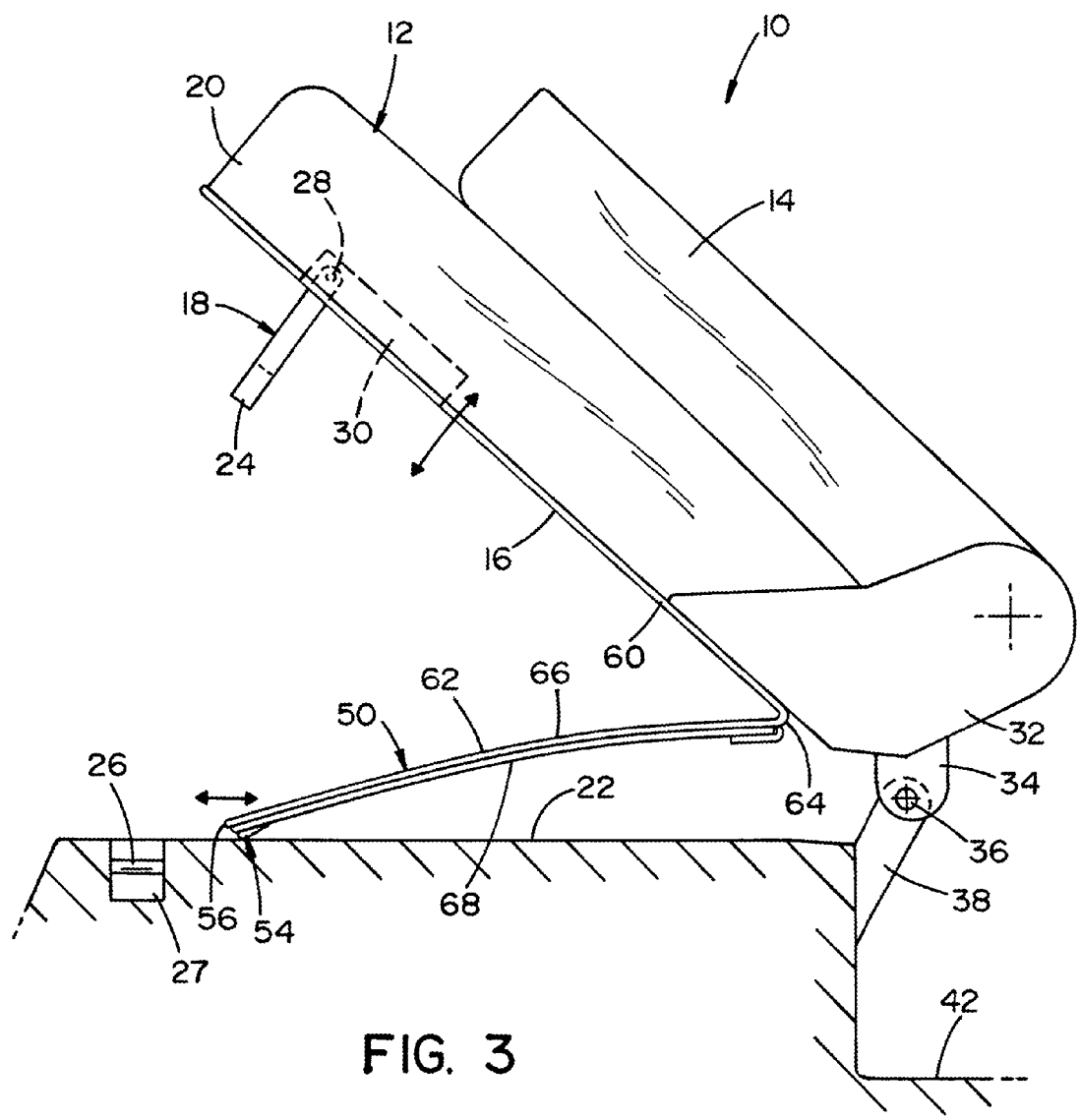
FIG. 3 is a schematic side elevational view of the fold and tumble vehicle seat being moved between the stowed position and the occupant position.

With additional reference to FIGS. 2 and 3, the seat back 14 can be folded onto the seat base 12 (counterclockwise in FIG. 1) to move the vehicle seat 10, and particularly the seat cushion 12, to the stowed position. The leg member 18 is disconnected from the striker 26 and can be pivoted into the recess 30. The seat cushion 12 is rotated about the pivot pin 36 (clockwise in FIG. 1) such that the underside 16 of the seat cushion 12 is flipped over to form a floor surface (FIG. 2) when the seat cushion 12 is fully rotated to the stowed position. In the illustrated embodiment, a recess 42 is formed in the floor surface 22 for accommodating the vehicle seat 10 in its stowed position. In particular, receipt of the vehicle seat 10 in the recess 42 allows the floor surface 16 to be at approximately zero degrees and/or substantially parallel or coplanar with an adjacent vehicle floor surface 44.

As shown, a seat flap 50 is connected or attached to the underside 16 of the seat cushion 12 for bridging a gap 52 formed between the seat cushion 12 and the adjacent vehicle floor surface 22 when the seat cushion 12 is in the stowed position (FIG. 2). More particularly, the seat flap 50 depends from the underside 16 of the seat cushion 12 when the seat cushion 12 is in the occupant position (FIG. 1). The seat flap 50 slides along the floor surface 22 as the seat cushion 12 is rotated to the stowed position (to the right in FIG. 3). The seat flap 50 extends from the underside 16 of the seat cushion 12 to the vehicle floor surface 22 when the seat cushion 12 is in the stowed position to bridge the gap 52 defined between the seat cushion 12 and the vehicle floor surface 22 (FIG. 2). The seat flap 50 again slides along the floor surface 22 as the seat cushion is rotated back to the occupant position (to the left in FIG. 3). As will be described in more detail below, the seat flap 50 includes at least one protruding tip 54 adjacent a distal end 56 thereof for facilitating the sliding movement of the distal end 56 along the adjacent vehicle floor surface 22 when the seat cushion 12 is rotated.

Figure 4:
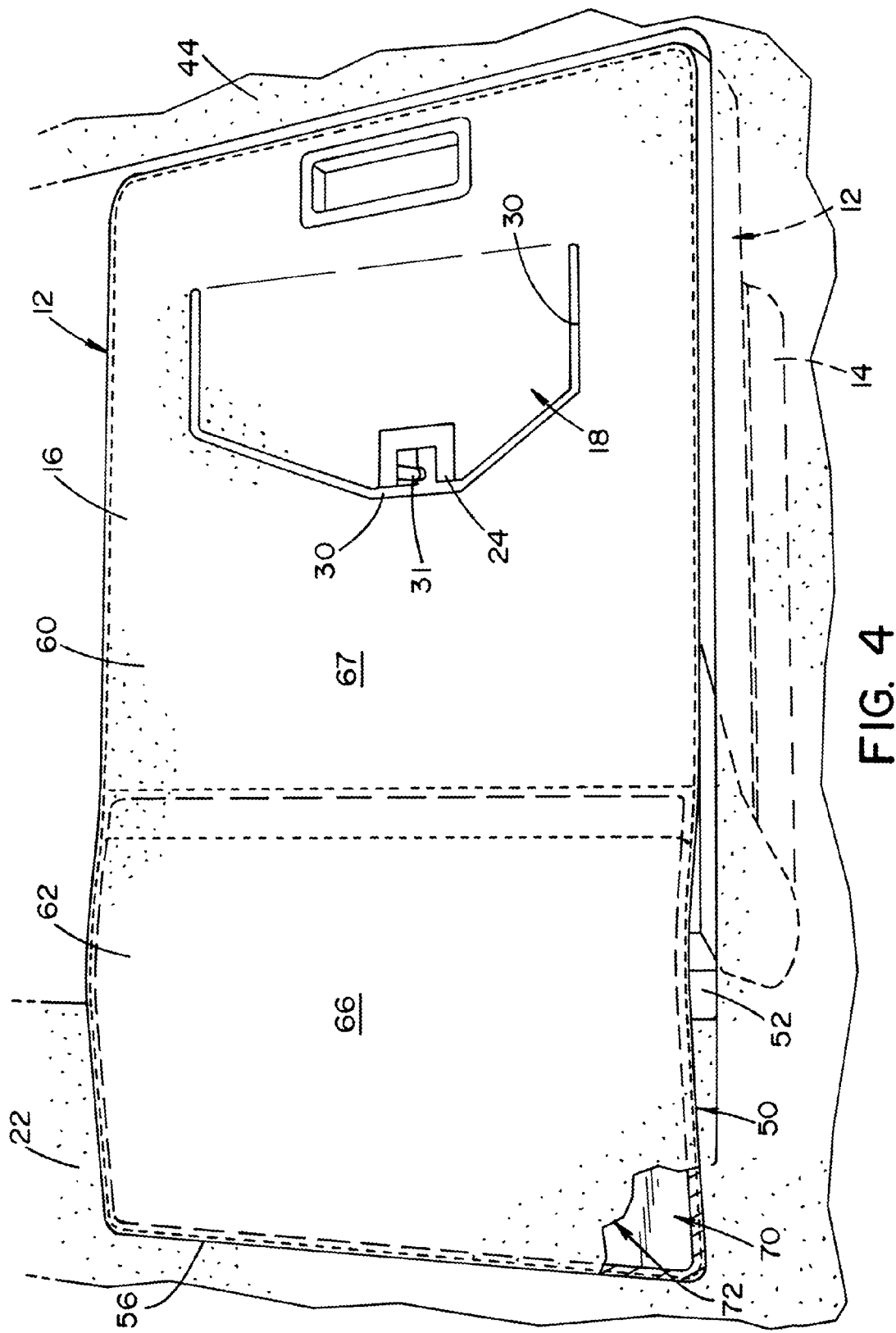
FIG. 4 is a top perspective view of the fold and tumble vehicle seat in the stowed position shown with a seat flap bridging a gap between an underside of a seat cushion and an adjacent vehicle floor surface.

In the illustrated embodiment, the seat flap 50 includes a proximal end portion 60 attached to the underside 16 of the rotatable seat cushion 12 and a distal end portion 62 depending from the underside 16 of the seat cushion 12. As shown in FIGS. 2 and 4, the distal end portion 62 covers the gap 52. A fold 64 is disposed between the proximal end portion 60 and the distal end portion 62. The at least one protruding tip 54 is disposed adjacent the distal end 56 of the distal end portion 62 for engaging and traversing the vehicle floor surface 22 when the seat cushion 12 is rotated. The protruding tip 54 can have a low coefficient of friction for slidable movement along the vehicle floor surface 22 when the seat cushion 12 is moved between the stowed position of FIG. 2 and the occupant position of FIG. 1. This can facilitate ease of movement and prevent premature wear of the seat flap 50.

More specifically, the seat flap 50 has the proximal end portion 60 secured to the underside 16 of the seat cushion 12 and the fold 64 interposed between the proximal end portion 60 and the distal end portion 62, and also the distal end 56, such that the distal end 56 is folded against the proximal end portion 60 when the seat cushion is in the occupant position of FIG. 1 and unfolded therefrom when the seat cushion 12 is in the stowed position of FIG. 2. As shown, the fold 64 is adjacent the underside 16 of the seat cushion 12 and the distal end 56 is spaced apart from the fold 64. The adjacent vehicle floor surface 22 is disposed under the seat cushion 12 when the seat cushion 12 is in the occupant position of FIG. 1, and the distal end 56 of the seat flap 50 moves along the vehicle floor surface 22 (as schematically shown in FIG. 3) when the seat cushion is moved between the occupant position of FIG. 1 and the stowed position of FIG. 2.

Figure 5:
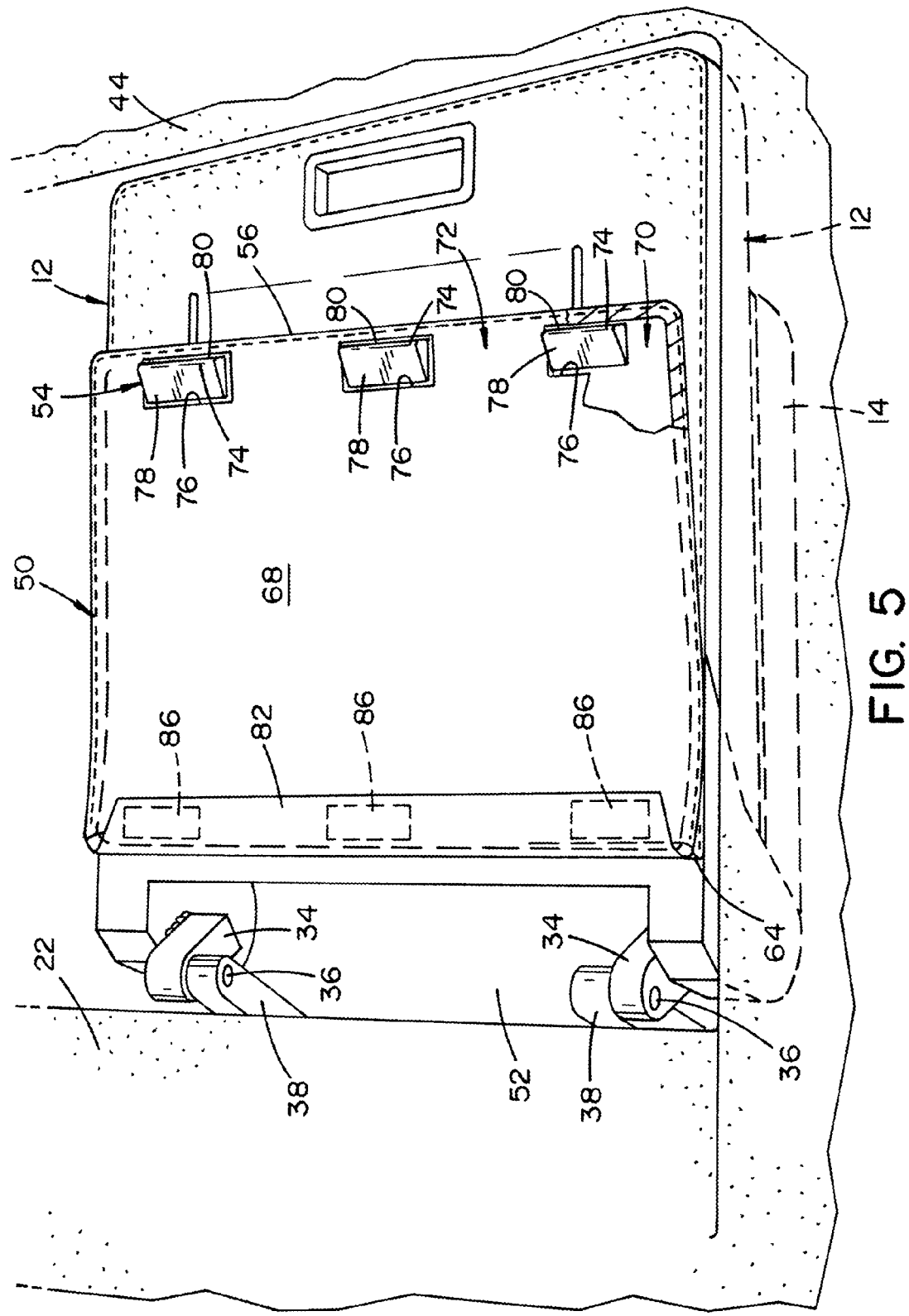
FIG. 5 is a view similar to FIG. 4, but shown with the seat flap folded back to reveal protruding tips disposed adjacent a distal end of the seat flap.

When the seat cushion 12 is in the occupant position of FIG. 1, the distal end portion 62 can include a first or show surface 66 facing the underside 16 of the seat cushion 12 and a second, opposite surface 68 facing the floor surface 22. As shown in FIG. 4, the first surface 66 faces upwardly along with a show surface 67 of the proximal end portion 60 when the seat cushion 12 is in the stowed position of FIG. 2. With reference to FIG. 5, the at least one protruding tip 54 extends in an orthogonal direction relative to the second, opposite surface 68.

Figure 6:
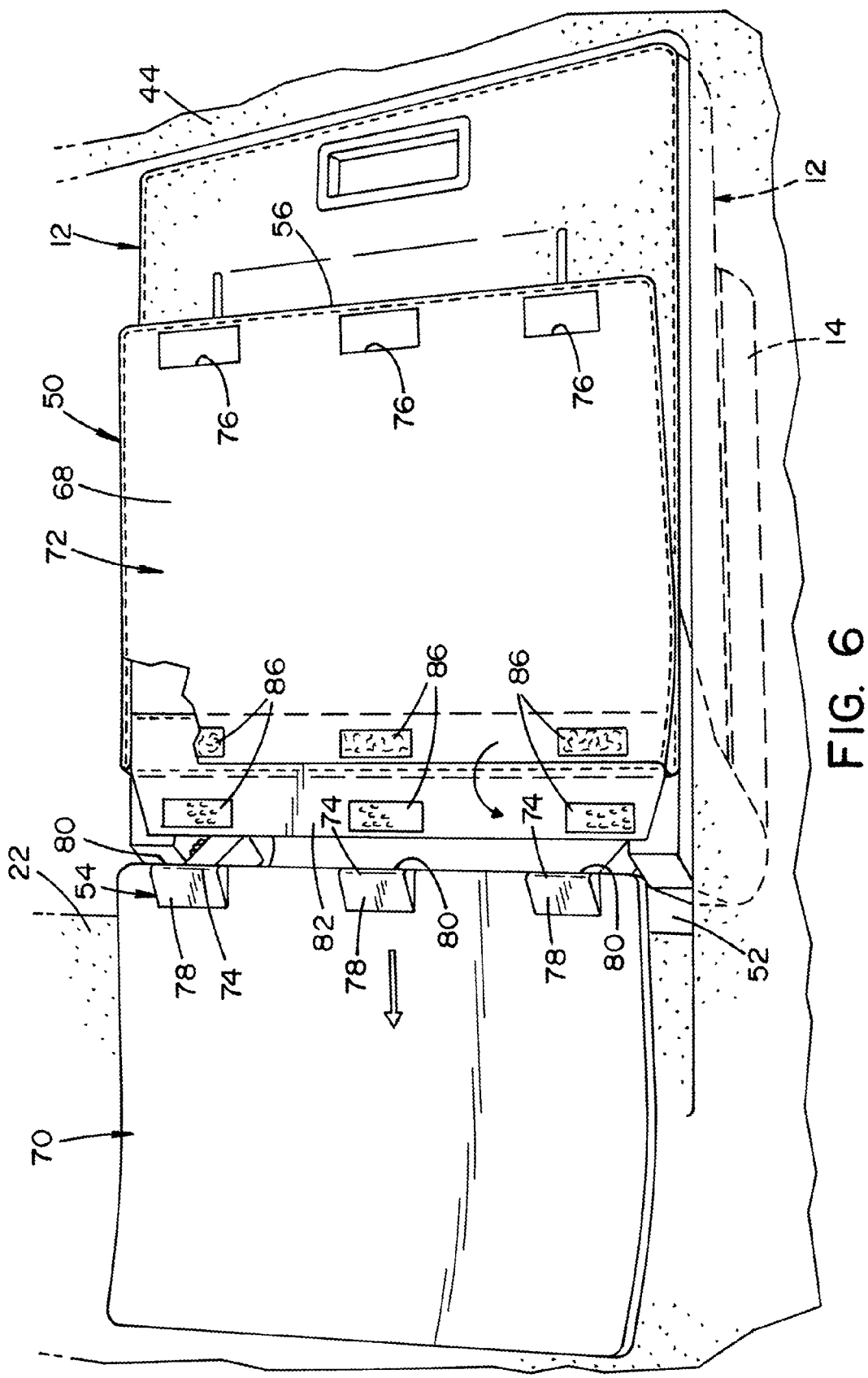
FIG. 6 is a view similar to FIG. 5, but shown with an insert having the protruding tips removed from a pocket of the seat flap.
Figure 7:
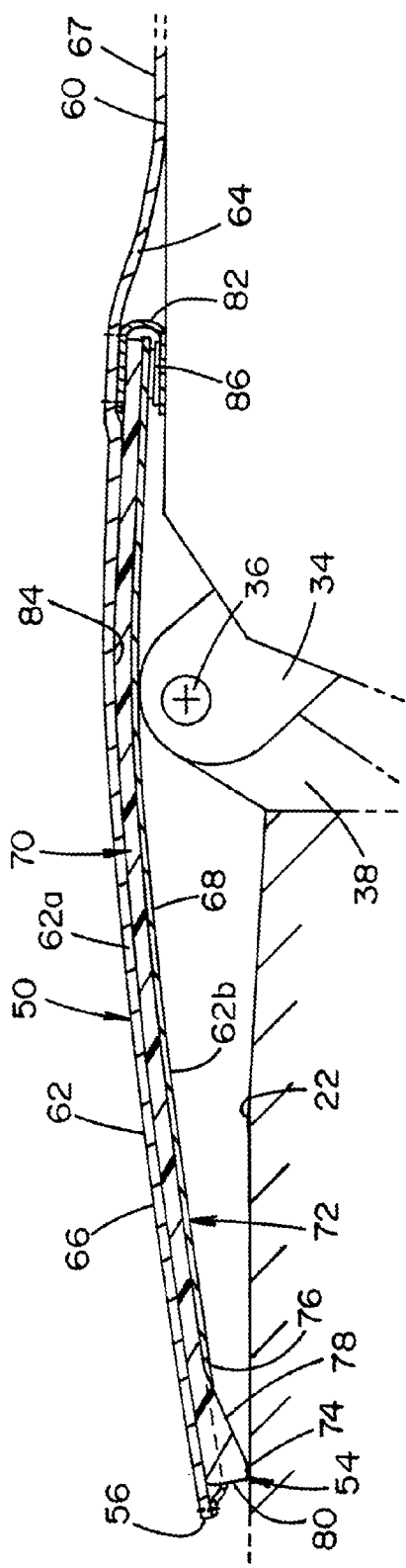
FIG. 7 is a partial cross-sectional view of the seat flap bridging the gap defined between the underside of the seat cushion and the adjacent vehicle floor surface.
Figure 8:
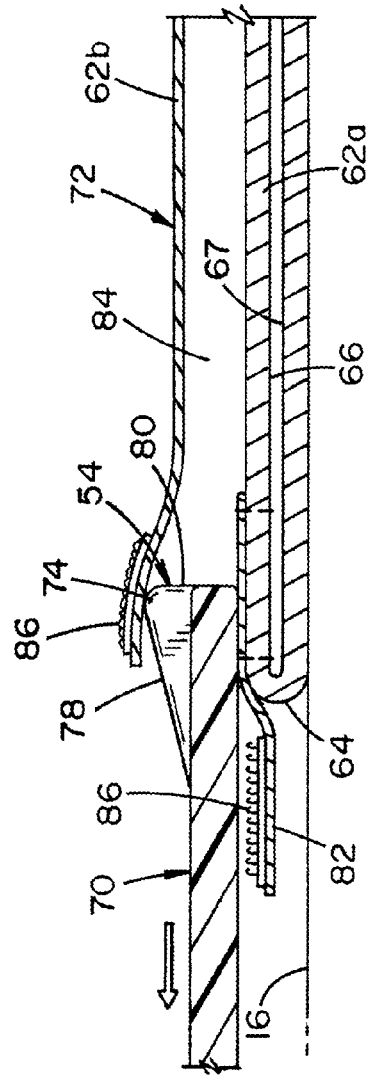
FIG. 8 is a partial cross-sectional view of the seat flap folded over and having the insert being removed from the pocket of the seat flap.

With reference to FIGS. 6-8, the first surface 66 can be provided on a first layer 62a of the distal end portion 62 and the second surface 68 can be provided on a second layer 62b of the distal end portion 62. As will be described in more detail below, the layers 62a, 62b can together form a pocket 84 (FIG. 8). The seat flap 50 can be formed of a first material and the at least one protruding tip 54 can be formed of a second material having a lower friction coefficient than the first material. For example, the seat flap 50 can be formed of a fabric or upholstered material and the protruding tip 54 can be formed of a second, more rigid material (i.e., more rigid than the first material). The second material can be plastic, for example, which has a relatively low coefficient of friction, particularly relative to the seat flap 50, which when formed of a fabric material has a relatively high coefficient of friction.

In the illustrated embodiment, the at least one protruding tip 54 can be formed on or of a plastic insert 70 that is received within a sleeve 72, and particularly a pocket 84 of the sleeve 72, defined by the upholstered material of the seat flap 50. Particularly, the at least one protruding tip 54 can include a plurality of laterally spaced-apart tip portions 74 (e.g., three in the illustrated embodiment) for engaging the vehicle floor surface 22. In the illustrated embodiment, the upholstered material and particularly the layer 62b defines at least one aperture 76 on the engagement side 68 thereof. The at least one protruding tip 54 extends through the at least one aperture 76 for contacting the vehicle floor surface 22. More particularly, in the illustrated embodiment, the at least one aperture is a plurality of laterally spaced-apart apertures 76 and each of the plurality of protruding tip portions 74 extends through a corresponding one of the plurality of spaced-apart apertures 76.

The insert 70 can have a generally planar body received in the sleeve 72 and the pocket 84 with the protruding tip portions 74 formed on the planar body and extending orthogonally therefrom. As best shown in FIG. 8, each tip portion 74 has a tapered profile. This tapered profile includes a gradually sloping side 78 facing the proximal end portion 60 and a sharply sloping side 80 facing the distal end 56. Alternatively, the side 80 can extend orthogonally from the insert 70. As shown, the insert 70 can be slid into the sleeve 72 and the protruding tip portions 74 can then pass through the apertures 76. A flap 82 can be provided for closing the sleeve 72 and preventing the insert 70 from moving relative to the sleeve 72. A fastener, such as a hook and loop type fastener 86 or a plurality of such fasteners 86 can be provided for selectively closing the flap 82 and securing it in its closed position to close the pocket.

By this arrangement, the tip portions 74 engage the carpeted floor surface 22 and facilitate sliding movement of the seat flap 50 when the seat cushion is moved between the occupant position and the stowed position. Instead of the fabric material of the seat flap 50 engaging and rubbing against the carpeted floor surface 22, the protruding tip portions 74 engage and slide along the floor surface 22. Advantageously, the protruding tip portions 74 better facilitate sliding movement of the seat flap 50 and do not wear prematurely.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A fold and tumble vehicle seat assembly, comprising:
   a seat cushion having an underside that forms a floor surface when said seat cushion is rotated to a stowed position; and
   a seat flap attached to said underside of said seat cushion for bridging a gap formed between said seat cushion and an adjacent vehicle floor surface when said seat cushion is in said stowed position, said seat flap including a protruding tip adjacent a distal end thereof that contacts said adjacent vehicle floor surface for facilitating sliding movement of said distal end along said adjacent vehicle floor surface when said seat cushion is rotated, wherein said seat flap is formed of a first material and said protruding tip is formed of a second material having a lower friction coefficient than said first material, and wherein the protruding tip extends through an aperture in the first material to contact said vehicle floor surface.

2. The fold and tumble vehicle seat assembly of claim 1 wherein said second material is plastic.

3. The fold and tumble vehicle seat assembly of claim 2 wherein said first material is a fabric material.

4. The fold and tumble vehicle seat assembly of claim 1 wherein said seat flap has a proximal end portion secured to said underside of said seat cushion and a fold interposed between said proximal end portion and said distal end such that said distal end is folded against said proximal end portion when said seat cushion is in an occupant position and unfolded when said seat cushion is in said stowed position.

5. The fold and tumble vehicle seat assembly of claim 4 wherein said fold is adjacent said underside of said seat cushion and said distal end is spaced apart from said fold, said adjacent vehicle floor surface disposed under said seat cushion when said seat cushion is in said occupant position and said distal end of said seat flap moving along said adjacent vehicle floor surface when said seat cushion is moved between said occupant position and said stowed position.

6. The fold and tumble vehicle seat assembly of claim 1 wherein said protruding tip includes a plurality of laterally spaced apart tip portions for engaging said adjacent vehicle floor surface.

7. The fold and tumble vehicle seat assembly of claim 1 wherein said protruding tip has a tapered profile.

8. The fold and tumble vehicle seat assembly of claim 1 wherein said seat cushion is a rotatable seat cushion and said seat flap includes:
   a proximal end portion attached to said underside of said rotatable seat cushion;
   a distal end portion depending from said underside of said rotatable seat cushion; and
   a fold disposed between said proximal end portion and said distal end portion; and
   wherein said protruding tip is disposed adjacent a distal end of said distal end portion for engaging and traversing a vehicle floor surface when said rotatable seat cushion is rotated.

9. The fold and tumble vehicle seat assembly of claim 8 wherein said seat flap is formed of an upholstered material and said protruding tip is formed of a second material that is more rigid than the upholstered material.

10. The fold and tumble vehicle seat assembly of claim 8 wherein said protruding tip has a tapered profile.

11. The fold and tumble vehicle seat assembly of claim 10 wherein said tapered profile includes a gradually sloping side facing said proximal end portion and a sharply sloping side facing said distal end.

12. The fold and tumble vehicle seat assembly of claim 8 wherein said distal end portion includes a first surface facing said underside of said seat cushion when said seat cushion is in an occupant position and a second, opposite surface facing said adjacent floor surface, said protruding tip extending in an orthogonal direction relative to said second, opposite surface.

13. The fold and tumble vehicle seat assembly of claim 1 wherein said protruding tip is formed as a plastic insert that is received within a sleeve defined by said upholstered material.

14. A fold and tumble vehicle seat assembly comprising:
   a seat cushion having an underside that forms a floor surface when said seat cushion is rotated to a stowed position; and
   a seat flap attached to said underside of said seat cushion for bridging a gap formed between said seat cushion and an adjacent vehicle floor surface when said seat cushion is in said stowed position, said seat flap including a protruding tip adjacent a distal end thereof for facilitating sliding movement of said distal end along adjacent vehicle floor surface when said seat cushion is rotated,
   wherein said seat cushion is a rotatable seat cushion and said seat flap includes:
   a proximal end portion attached to said underside of said rotatable seat cushion,
   a distal end portion depending from said underside of said rotatable seat cushion, and
   a fold disposed between said proximal end portion and said distal end portion;
   wherein said protruding tip is disposed adjacent a distal end of said distal end portion for engaging and traversing a vehicle floor surface when said rotatable seat cushion is rotated, wherein said seat flap is formed of an upholstered material and said protruding tip is formed of a second material that is more rigid than the upholstered material, and wherein said protruding tip is formed as a plastic insert that is received within a sleeve defined by said upholstered material.

15. The fold and tumble vehicle seat assembly of claim 14 wherein said upholstered material defines an aperture on an engagement side thereof, said at least one protruding tip extends through said at least one aperture for contacting said vehicle floor surface.

16. The fold and tumble vehicle seat assembly of claim 15 wherein said at least one aperture is a plurality of laterally spaced apart apertures and said protruding tip is a first tip of a plurality of protruding tips, each of said plurality of protruding tips extends through a corresponding one of said plurality of spaced apart apertures.

17. The fold and tumble vehicle seat assembly of claim 14 wherein said vehicle floor surface is a carpeted surface.

18. The fold and tumble vehicle seat assembly of claim 14 wherein said insert has a generally planar body received in said sleeve with said protruding tip formed on said planar body and extending orthogonally therefrom.

19. A fold and tumble vehicle seat assembly, comprising:
a seat cushion rotatable to a stowed position wherein an underside of said seat cushion is flipped over;
a seat flap connected to said underside of said seat cushion so as to depend therefrom when said seat cushion is in an occupant position and to extend from said underside to a vehicle floor surface when said seat cushion is in a stowed position to bridge a gap defined between said seat cushion and said vehicle floor surface, said seat flap including an upholstered material and a protruding tip engaging said vehicle floor surface and having a low coefficient of friction for slidable movement along said vehicle floor surface when said seat cushion is moved between said stowed position and said occupant position, wherein said protruding tip is formed as a rigid insert that is received within a sleeve defined by said upholstered material.

20. The fold and tumble vehicle seat assembly of claim 19 wherein the seat flap is formed of a first fabric material having a high coefficient of friction.

21. The fold and tumble vehicle seat assembly of claim 19 wherein said rigid insert is formed as a plastic insert.

* * * * *